United States Patent [19]
Filipescu et al.

[11] 4,037,172
[45] July 19, 1977

[54] PLASTIC LASER MATERIALS

[75] Inventors: Nicolae Filipescu, Arlington, Va.; Nelson McAvoy, Silver Spring; Morton R. Kagan, Potomac, both of Md.; Francis A. Serafin, Alexandria, Va.

[73] Assignee: American Standard, Inc., New York, N.Y.

[21] Appl. No.: 309,560

[22] Filed: Sept. 17, 1963

[51] Int. Cl.² .................................................. H01S 3/16
[52] U.S. Cl. .............................. 331/94.5 E; 252/301.18
[58] Field of Search ..................... 331/94.5; 252/301.2

[56] References Cited

U.S. PATENT DOCUMENTS 3,225,307  12/1965  Weissman ..................... 331/94.5 L

OTHER PUBLICATIONS

Schimitschek et al., Organometallic Compounds as Possible Laser Materials, Nature, vol. 196, No. 4857 (Dec. 1, 1962) pp. 832 and 833.

Andrews, Plastic Laser Potential Seen for Ending Limits on Shape, Electronic News (Mar. 11, 1963).

Wolff et al., Optical Maser action in an $Eu^{+3}$-Containing Organic Matrix, Appl. Phys. Let., vol. 2, No. 8 (Apr. 15, 1963) pp. 152-154.

Electrical Engineering, vol. 82, No. 6 (June 1963) p. 420.

*Primary Examiner*—William L. Sikes
*Attorney, Agent, or Firm*—James J. Salerno, Jr.

[57] ABSTRACT

A material exhibiting narrow line fluorescence when excited by high energy radiation, hence suitable for laser applications, is formed by dispersion of rare earth ions bonded to organic molecules in the form of an organometallic chelate, in solid solution in a plastic host.

21 Claims, 2 Drawing Figures

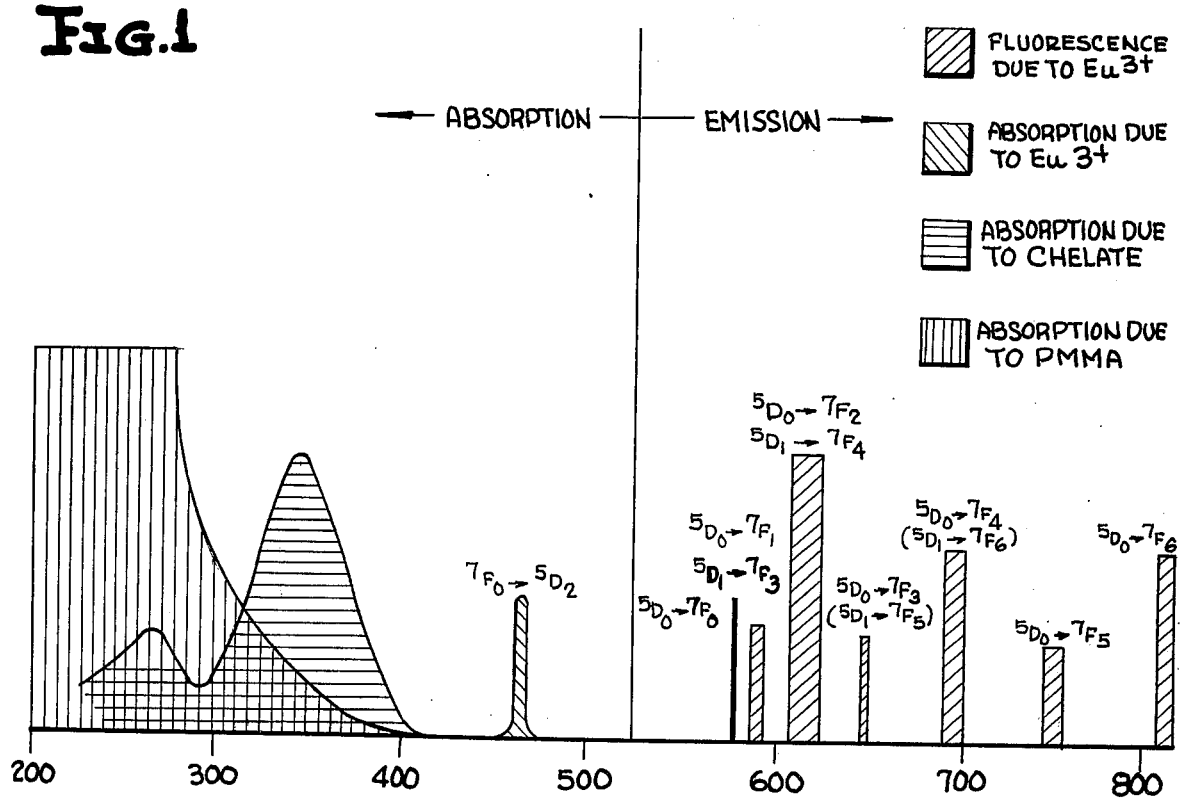
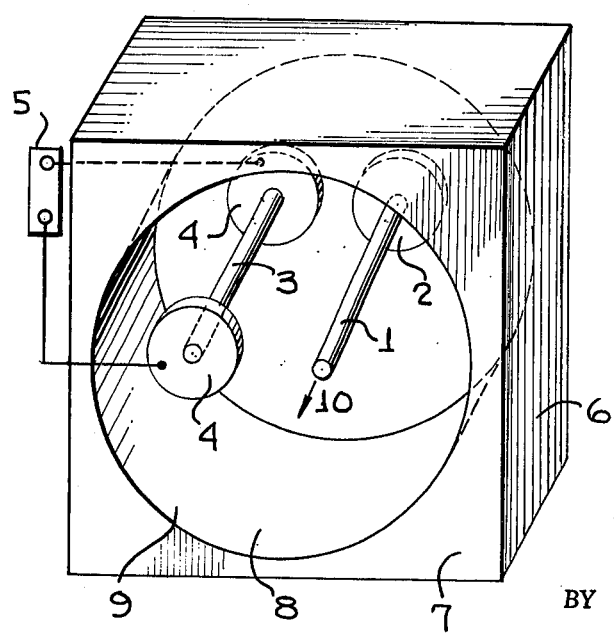

PLASTIC LASER MATERIALS

This invention relates to optical maser, i.e. laser, materials. More particularly, the invention concerns lasers comprising rare earth metal chelates distributed in a matrix.

In the operation of an optical maser, there is involved stimulation of narrow-line, coherent radiation, by reason of the presence of an activator capable of narrow-line emission. In accordance with Plank's law, there is a transition of activator ions from one energy state to another by the absorption or emission of a definite amount of energy in the form of electromagnetic waves. The phenomenon known as population inversion whereby the number of activator ions in one or more higher energy levels exceeds that in the lowest energy level occurs in response to their absorption of energy from a high power pumping source, e.g. a mercury or xenon light. As the ions return to their normal population states, they give off energy in the form of coherent radiations. This process is generally referred to as stimulated emission.

Both solid state and gaseous media are known which provide coherent light radiation by stimulated emission. The solid state materials have heretofore taken the form of short cylinders or rods of host materials selected from inorganic glasses or various single crystals. Precise amounts of active doping materials, such as chromium oxides and rare earths, are added to the host so coherent radiation can be derived when the material is suitably activated.

The preparation of doped, single crystals is very difficult, time consuming and expensive. In many cases, crystals cannot be grown of satisfactory quality and size. Incorporation of potentially active molecules into glasses is difficult, expensive and provides inadequate narrow-line luminescence necessary for high power coherent radiation.

It is known that strong narrow-line fluorescence and long radiative lifetimes are prerequisite for efficient laser material. Furthermore, observations of sharp-line emission indicate that homogeneous diffusion of the active ions throughout the host, and small interaction between the lattice and the ions are both necessary for efficient laser systems. This is particularly true of rare-earth elements, which are extremely difficult to incorporate into single crystals, because they require a crystal of large lattice constant.

We have found that organic host systems doped with metals are superior to crystals and glasses for potential laser applications because the central metal ion is surrounded by an electric field of known symmetry and constant magnitude. In addition to the high degree of symmetry, the fields involved in organic host systems are much weaker than those found in single crystals, because of the covalent nature of the bonds. This combination of high symmetry, weak fields, and equivalent environments for each ion assures the production of narrow-line discrete spectra in organic hosts.

In accordance with the present invention, there are provided organic plastic host systems having incorporated therein potentially active rare earth chelate molecules which possess particular advantages. Among the practical advantages are that the polymeric host material can be fabricated or molded to any desired size and shape, and that doping is homogeneous and can be of any desired concentration.

The chemistry involved in the synthesis and fabrication of the polymer insures precise control of concentration, while the plastic host provides optical isotropy.

In accordance with the present invention, there are incorporated in polymeric hosts, organometallic compounds of transition metals, to provide easily prepared and worked laser materials exhibiting sharp fluorescent lines. Generally, organic polymers are slowly degraded by high energy radiation, such as ultraviolet radiation. However, many commercially available plastic materials are able to withstand, with no apparent significant changes, exposure to ultraviolet radiation for indefinite periods of time when there is incorporated into the plastic material an additive capable of absorbing the radiation. These additives include the rare earth metal chelates, employed in accordance with the invention.

It is accordingly an object of the present invention to provide a new and improved laser and laser material.

Another object of the invention is to provide a new and improved laser employing a plastic host material.

A further object of the invention is to provide a laser material wherein a rare earth metal chelate is doped into a solid polymer matrix.

An additional object is to provide a laser material wherein a ion doped into a plastic is surrounded by a symmetrical, constant electric field of weak bonding strength.

A still further object of the invention is to provide a laser material that can be; fabricated to any desired size and shape; and homogeneously doped to any desired concentration.

Yet another object of the invention is to provide a polymer laser material capable of withstanding large quantities of ultraviolet radiation over long time periods without degradation to the polymer.

The above and still further objects, features and advantages of the present invention will become apparent upon consideration of the following detailed description of one specific embodiment thereof, especially when taken in conjunction with the accompanying drawings, wherein:

FIG. 1 is a diagram of the spectroscopic properties of one of the materials of the present invention; and FIG. 2 is a diagram of the apparatus in which the laser materials of the invention is utilized.

The polymeric host materials employed in accordance with the invention are those which provide high optical quality organic glasses. Particularly advantageous are those polymers derived from an ethylenically unsaturated monomer, or comonomer. Examples of suitable monomeric materials include methyl methacrylate, styrene, acrylonitrile, N-vinyl carbazole, vinyl acetate, triallyl carbonate, and vinyl pyridine, or any mixture or combination of these. The preferred monomer is methyl methacrylate. These materials are polymerized in accordance with conventional procedures, without or with a polymerization catalyst, at normal or elevated pressures, in air or under an inert atmosphere.

The organic chelates of transition metals which are soluble in the monomer are preferred. The preferred class of transition metals are the rare earth metals, including, for example, holmium, europium, terbium, samarium, ytterbium, neodymium, and dysprosium, the preferred metal being europium.

The organometallic chelates employed as activators in the polymeric host material, in accordance with the invention, are those derived from four classes of organic compound: (1) β-diketones, (2) hydroxyaldehydes, (3) hydroxy acids, and (4) 8-hydroxyquinolines.

The beta-diketone chelates are synthesized in accordance with known methods, such as disclosed in articles of J. C. Reid and M. Calvin, J.A. C. S. 72, 2948 (1950); A. Sieglitz and O. Horn, Berichte, 84, 607 (1951); and Adams et al, Organic Reactions, Vol. VIII, John Wiley (1954). Examples of β-diketones which are employed to form rare earth metal chelates include: benzoylacetone, benzoyltrifluoroacetone, dibenzoylmethane, ditheonylmethane, furoylacetone, 2-furoylbenzoylmethane, 2-furoyltrifluoroacetone, hexafluoroacetylacetone, 1-acetyl-1-methyl acetone, β-naphthoyltrifluoroacetone, 2-theonylacetone, 2-theonyltrifluoroacetone (4,4,4-trifluoro-1,2-thienyl-1,3-butanedione), 1,1,1-trifluoroacetylacetone, 1,3-diphenyl-1,3-propanedione and 1-phenyl-1,3-butanedione. These beta-diketone chelates are prepared, for example, by reacting a rare earth metal chloride and the beta-diketone in an anhydrous organic solvent, and precipitating the chelate.

Examples of suitable hydroxyaldehydes include those derived from benzene and naphthalene, and their alkyl, alkoxy, and halo-substitution derivatives, such as 3-chlorosalicylal- dehyde, 5-chlorosalicylaldehyde, 4,6-dimethylsalicylaldehyde, 2-hydroxy-1-naphthaldehyde, and 2-hydroxy-3-napthaldehyde. These are prepared by reacting a rare earth metal halide with an excess of the hydroxyaldehyde either by boiling in toluene or xylene, or by titration in an anhydrous solvent, e.g. anhydrous ethanol with a precipitant, e.g. ammonia or piperidine.

Examples of suitable hydroxy acids include salicylic acid, anthraquinone carboxylic acid, and naphthoic acids. The chelates are prepared in the same manner as those derived from hydroxyaldehydes.

8-hydroxyquinoline and its alkyl, aryl, and halo-substituted derivatives may also be employed for preparation of metal chelates, using procedures similar to those employed for the hydroxyaldehyde derivatives.

The foregoing chelates all dissolve in the monomers and form solid solutions therein when the monomers are polymerized. The monomer is partially prepolymerized to the form of a syrup, the chelate is dissolved therein, the syrup is cast into rods or tubes, and the polymerization completed. The amount of metal chelate thus incorporated is not critical, but may range from about 0.01 to 0.02 grams per 100 cc. of resin syrup, or enough to provide from about $10^{17}$ to $10^{18}$ ions per cc.

The preparation and properties of the novel organometallic laser materials of the invention are illustrated by the following examples, which are not, however, to be considered as limiting:

EXAMPLE 1

A europium tris-beta-diketone chelate was first prepared by dissolving 8 grams (0.0036 mol) of 4,4,4-trifluoro-1-(2-thienyl)-1,3-butanedione and 2.6 grams (0.001 mol) of anhydrous $EuCl_3$ in 150 ml. of absolute ethanol. The stirred solution was titrated with 20% ethanolic solution of piperidine to a pH value of 6.5. The resulting solution was evaporated on the steam bath to about 25 ml. volume, cooled, and the precipitated crystals were collected on a fritted glass funnel, washed with ligroin, and dried in vacuum for 24 hours.

Monomeric methyl methacrylate containing 0.002% benzoyl peroxide as a polymerization catalyst was heated at 70° C. until it thickened to a syrup having at room temperature a viscosity of about 30 poises. To this syrup there was added 0.015 grams of the europium per 100 cc. syrup, and the syrup was poured into a glass casting mold. The polymerization was continued under a nitrogen atmosphere in a constant temperature oven at 45° C. until solidification was complete. The chelate was completely soluble in the host resin and the resulting solid polymer is homogeneous. The rods were 2 mm. diameter and 6 inches long.

Parallelepiped samples were cut from the cast material and polished for spectroscopic evaluation, luminescence studies and absorption measurements. The dimensions of these samples were approximately 28 mm. $\times$ 9 mm. $\times$ 7 mm., the europium ion concentrations ranging from $10^{17}$ to $10^{22}$ ions per cc. in the polymethylmethacrylate host. Samples less than 1 mm. thick were used for ultraviolet absorption measurements, and having a concentration of $10^{17}$ ions per cc.

The absorption spectra were measured with a model Cary 14 recording spectrophotometer. This instrument consists essentially of a grating prism monochrometer of 1 A resolution in the 2,000 to 20,000 A range with dual beam operation for absorption and single beam for fluorescence.

The absorption and fluorescence properties of europium chelate prepared as described, incorporated into a methyl methacrylate host showed absorption in a band approximately 500 A wide, with the peak centered at 340 mμ. At the same europium ion concentration per unit volume, the chelate absorbs many thousand times more than a purely ionic europium doped inorganic crystal, thus providing high pumping efficiency. The absorption band is ideally situated, overlapping the emission range of the xenon lamp and falling outside the absorption range of the polymethyl methacrylate host.

EXAMPLE 2

The tris-(4,4,4-trifluoro-1,2,-thienyl-1,3-butanedione) chelate of samarium was prepared in the same manner as described in Example 1. The chelate was dissolved in monomeric methyl methacrylate which was deinhibited and then distilled under nitrogen to purify it. There was added to the monomer about 0.01% of benzoyl peroxide and it was heated with stirring at 80–90° C. until it became a syrup, cooled and the desired amount of the chelate dissolved with stirring until homogeneous.

In polymethylmethacrylate, fluorescent lines were found at 645 mμ, 598 mμ, and 562 mμ at both 300° K. and 77° K. with excitation into a broad absorption band centered at approximately 300 m .

The mechanism believed to be responsible for the line fluorescence in beta-diketone chelates of europium is an intramolecular energy transfer from the lowest triplet state of the organic complex to the $5_{D_1}$ and $5_{D_0}$ resonance energy levels of the central europium ion. This mechanism involves absorption from the singlet ground state to excited singlet and triplet states followed by radiationless transitions to the lowest triplet state and subsequently to the $5_{D_1}$ and $5_{D_0}$ resonance levels. From these levels, fluorescence transitions to all low lying $7_F$ levels of the europium ion occur.

Of the various beta-diketone chelates, the tris-(4,4,4-trifluoro-1,2-thienyl-1,3-butanedione) chelate of europium has the advantages of greater solubility in monomers and polymers. Further, it yields line fluorescence and excitation in the visible and near ultraviolet range of the spectrum, where the polymeric host does not absorb, thus avoiding photochemical degradation. This chelate has the lowest lying triplet state situated between the two resonance levels of europium at 19,020 cm$^{-1}$ and 17,250 cm$^{-1}$, no competitive fluorescence occurs and only fluorescent transitions from the $5_{D_0}$ (17,250 cm$^{-1}$) level to the low lying $7_F$ levels are observed. This characteristic is illustrated in FIG. 1 of the accompanying drawings wherein absorption and emission amplitude are plotted against wavelength, in millimicrons.

The novel optical maser materials of the invention may be employed for the generation and emission of stimulated radiation utilizing conventional circuit arrangements generally employed for this purpose. A suitable form of apparatus is illustrated in FIG. 2 of the accompanying drawings. In FIG. 2, a thin rod of polymethylmethacrylate containing the europium chelate is shown generally at 1, supported by a suitable mounting such as a metal disc 2. Parallel to the optical maser rod is a source of ultraviolet radiation, such as a xenon lamp 3, mounted on supporting discs 4. The discs are connected to a source of high voltage electrical energy 5. Both the xenon tube and the maser rod are shown mounted within a solid metal chamber 6 formed by a block of metal 7 having a central opening 8 provided with reflecting surface 9 having a generally elliptical cross section. Lamp 3 and rod 1 are placed at the foci of the ellipse so that maximum energy from source 3 impinges on rod 1 to enable the largest possible amount of energy to be derived from the rod.

Excitation of the maser rod 1 by ultraviolet radiation from lamp 3 results in the emission of narrow-line luminescence in the direction indicated by arrow 10.

While we have described and illustrated one specific embodiment of my invention, it will be clear that variations of the details of construction which are specifically illustrated and described may be resorted to without departing from the true spirit and scope of the invention as defined in the appended claims.

What is claimed is:

1. An optical maser material comprising a solid polymeric matrix having uniformly distributed therein a rare earth metal chelate.

2. An optical maser material comprising a solid polymerized ethylenically unsaturated monomer having uniformly distributed therein in solid solution a rare earth metal chelate.

3. An optical maser material comprising a solid polymerized ethylenically unsaturated monomer having uniformly distributed therein in solid solution a rare earth metal chelate of a beta-diketone.

4. An optical maser material comprising a solid polymerized ethylenically unsaturated monomer having uniformly distributed therein in solid solution a rare earth metal chelate of a hydroxyaldehyde.

5. An optical maser material comprising a solid polymerized ethylenically unsaturated monomer having uniformly distributed therein in solid solution a rare earth metal chelate of a hydroxycarboxylic acid.

6. An optical maser material comprising a solid polymerized ethylenically unsaturated monomer having uniformly distributed therein in solid solution a rare earth metal chelate of a member selected from the group consisting of 8-hydroxyquinoline and its alkyl, aryl, and halo-substituted derivatives.

7. An optical maser material comprising polymethylmethacrylate having uniformly distributed therein in solid solution a rare earth metal chelate.

8. An optical maser material comprising polymethylmethacrylate having uniformly distributed therein a europium chelate.

9. An optical maser material comprising polymethylmethacrylate having uniformly distributed therein europium tris-(4,4,4-trifluoro-1-(2-thienyl)-1,3-butanedione chelate.

10. The maser material of claim 9 in which the concentration of europium ion in the polymer is between about $10^{17}$ and $10^{20}$ ions per cc.

11. An optical maser material comprising a polymerized ethylenically unsaturated monomer having distributed therein in solid solution a rare earth metal chelate.

12. An optical maser material comprising a polymerized ethylenically unsaturated monomer having distributed therein in solid solution a rare earth metal chelate of a beta-diketone.

13. An optical maser material comprising a polymerized ethylenically unsaturated monomer having distributed therein in solid solution a rare earth metal chelate of a hydroxyaldehyde.

14. An optical maser material comprising a polymerized ethylenically unsaturated monomer having distributed therein in solid solution a rare earth metal chelate of a hydroxycarboxylic acid.

15. An optical maser material comprising a polymerized ethylenically unsaturated monomer having distributed therein in solid solution a rare earth metal chelate of a member selected from the group consisting of 8-hydroxyquinoline and its alkyl, aryl, and halo-substituted derivatives.

16. A material exhibiting narrow-line fluorescence when excited by a high energy light source, comprising an europium chelate dispersed in solid solution in a plastic host.

17. The invention according to claim 16 wherein said plastic host is a polymeric matrix.

18. The invention according to claim 17 wherein said polymeric matrix is polymethyl methacrylate.

19. The invention according to claim 18 wherein said chelate of europium comprises europium ions in an organic complex formed by chelation with a beta-diketone.

20. The invention according to claim 19 wherein said material is in the form of a rod.

21. For use in generating coherent radiation by stimulated emission, a member comprising rare earth ions bonded to organic molecules in the form of an organometallic chelate, dispersed in solid solution in a plastic host material.

* * * * *